United States Patent
Nakaya et al.

(10) Patent No.: US 10,161,799 B2
(45) Date of Patent: Dec. 25, 2018

(54) TEMPERATURE MEASURING DEVICE AND TEMPERATURE MEASURING METHOD

(71) Applicant: The University of Tokyo, Tokyo (JP)

(72) Inventors: Shinji Nakaya, Tokyo (JP); Mitsuhiro Tsue, Tokyo (JP)

(73) Assignee: The University of Tokyo, Tokyo (JP)

( * ) Notice: Subject to any disclaimer, the term of this patent is extended or adjusted under 35 U.S.C. 154(b) by 0 days.

(21) Appl. No.: 15/553,399

(22) PCT Filed: Feb. 24, 2016

(86) PCT No.: PCT/JP2016/055529
§ 371 (c)(1),
(2) Date: Aug. 24, 2017

(87) PCT Pub. No.: WO2016/136844
PCT Pub. Date: Sep. 1, 2016

(65) Prior Publication Data
US 2018/0073928 A1    Mar. 15, 2018

(30) Foreign Application Priority Data
Feb. 25, 2015 (JP) .................. 2015-035022

(51) Int. Cl.
*G01J 5/00* (2006.01)
*G01J 5/48* (2006.01)
*G01J 5/60* (2006.01)

(52) U.S. Cl.
CPC ............... *G01J 5/0014* (2013.01); *G01J 5/00* (2013.01); *G01J 5/48* (2013.01); *G01J 5/60* (2013.01)

(58) Field of Classification Search
CPC ........ G01J 5/00; G01J 5/48; G01J 5/60; G01J 5/0014
See application file for complete search history.

(56) References Cited

U.S. PATENT DOCUMENTS

| 9,506,807 B2 | 11/2016 | Ido et al. |
| 2007/0246653 A1* | 10/2007 | Zhou .................. G01J 3/02 250/339.1 |
| 2014/0286376 A1 | 9/2014 | Ido et al. |

FOREIGN PATENT DOCUMENTS

| JP | 3379352 B2 | 2/2003 |
| JP | 2004-45268 A | 2/2004 |

(Continued)

OTHER PUBLICATIONS

Yamashita et al., "Study on the Application and Spectroscopic Temperature Measurement of High Temperature Steam Flow Generated by Hydrogen-Oxygen Combustion," Research Institute for Technology, Tokyo Denki University Annual Report, May 31, 1997, pp. 87-94 (with English Abstract), 8 pgs.

(Continued)

*Primary Examiner* — David Porta
*Assistant Examiner* — Faye Boosalis
(74) *Attorney, Agent, or Firm* — Seed Intellectual Property Law Group LLP (57) ABSTRACT

A temperature measuring method and device is capable of measuring temperature of a gas, and particularly temperature of a gas that contains water vapor, in a non-contact manner and with good precision. A spectroscopic unit 10 acquires at least a light intensity in a first wavelength band and a light intensity in a second wavelength band, from radiated light from water vapor that is an object to be measured. The first wavelength band and the second wavelength band are both near infrared region bands. A central wavelength of the first wavelength band and a central wavelength of the second wavelength band are set to be mutually different values. A temperature calculation unit calculates temperature of water vapor using a ratio of light (Continued)

intensity in the first wavelength band to light intensity in the second wavelength band.

11 Claims, 7 Drawing Sheets

(56) References Cited

FOREIGN PATENT DOCUMENTS

JP     2014-182106 A    9/2014
WO   2005/095914 A1   10/2005

OTHER PUBLICATIONS

Serdyukov et al., "Investigation of the Water Vapor Emission Spectrum in the Region 9600-12000 cm$^{-1}$," *Optics and Spectroscopy 101*(4): 532-536, 2006.

International Search Report for Application No. PCT/JP2016/055529, dated Apr. 12, 2016, 2 pgs.

Xin Zhou et al., "Development of a sensor for temperature and water concentration in combustion gases using a single tunable diode laser; A sensor for temperature and water concentration in combustion gases", Measurement Science and Technology, IOP, Bristol, GB, vol. 14, No. 8, Aug. 1, 2003, pp. 1459-1468 XP020063884, ISSN: 0957-0233, DOI: 10.1088/0957-0233/14/8/335.

EPO Communication dated Oct. 5, 2018 by the European Patent Office to EP application No. 16755588.7.

\* cited by examiner

TEMPERATURE MEASURING DEVICE AND TEMPERATURE MEASURING METHOD

BACKGROUND

Technical Field

The present disclosure relates to technology for measuring temperature of a gas, and particularly temperature of a gas that contains water vapor.

Description of the Related Art

Water vapor is contained in air and in a lot of high temperature reactive gasses. Basically, water vapor is in thermal equilibrium with a gas that contains water vapor. This means that gas temperature can be measured by tracking the temperature of water vapor. As a simple temperature measurement means for water vapor, a thermocouple, which is a contact type sensor, is widely used. However, since a thermocouple is a contact type sensor, there is a problem in that a system will be disrupted. Although a thermocouple can measure from a comparatively low temperature, dealing with high-temperature regions is difficult due to restrictions such as heat resisting temperature of the thermocouple material.

On the other hand, for non-contact measurement there are a Laser Induced Fluorescence (LIF) method and a Coherent Anti-Stokes Raman Spectroscopy (CARS) method, etc., that use lasers. However, there are problems in that a system for implementing these methods is extremely high cost, and versatility of use is low.

There are also temperature measurement methods that use infrared radiation measurement utilizing radiation of carbon dioxide. However, with this method it is necessary to add carbon dioxide. Moreover, sensors consisting of material such as glass and indium gallium arsenide (InGaAs), etc., that can be used in the infrared region are uncommon so that there is the disadvantage that the system becomes high cost.

High temperature measurement using a two color method that utilizes black-body radiation is also known (for example, Patent Publication 1 below). However, with this method it is necessary for a solid body that generates black-body radiation to be included in a physical object to be measured. This means that in order to use this two color method in water vapor measurement, it is necessary, for example, for solid particles to exist, and there is a problem in that usage environments are restricted.

CITATION LIST

Patent Literature

Patent Publication 1: Japanese patent laid-open number 2004-45268

BRIEF SUMMARY

In order to solve the previously mentioned problems, the present inventors have acquired the following knowledge resulting from various studies.

Water vapor that is contained in combustion and reaction gases has a strong emission intensity in the near infrared region, compared to other principal chemical species. That is, emission from water vapor has almost no overlap of wavelength band with emissions of other principal chemical species.

Accordingly, it is possible to measure water vapor temperature with good precision using a relationship between water vapor temperature and intensity of near infrared light that is irradiated from water vapor.

The present disclosure has been conceived on the basis of this knowledge, and provides technology that is capable of measuring temperature of a gas, and particularly temperature of a gas that contains water vapor, in a non-contact manner and with good precision.

Means for solving the above-described problems are described as in the following aspects.

(Aspect 1)

A temperature measuring device comprising a spectroscopic unit and a temperature calculation unit, wherein the spectroscopic unit acquires at least a light intensity in a first wavelength band and a light intensity in a second wavelength band, from radiated light from water vapor that is contained in a gas that is an object to be measured. The first wavelength band and the second wavelength band are both near infrared region bands and a central wavelength of the first wavelength band and a central wavelength of the second wavelength band have mutually different values. The temperature calculation unit calculates the temperature of the water vapor using a ratio of light intensity in the first wavelength band to light intensity in the second wavelength band.

(Aspect 2)

The temperature measuring device of aspect 1, wherein the near infrared region band is a wavelength band of about 700 nm to 2500 nm.

(Aspect 3)

The temperature measuring device of aspect 1 or aspect 2, wherein the central wavelength of the first wavelength band is within a range of about 810 to 890 nm, and the central wavelength of the second wavelength band is in a range of about 900 to 950 nm.

(Aspect 4)

The temperature measuring device of any one of aspects 1 to 3, wherein the first wavelength band and the second wavelength band are set to bands that do not overlap each other.

(Aspect 5)

The temperature measuring device of any one of aspects 1 to 4, wherein the spectroscopic unit is provided with a light intensity acquisition unit that acquires light intensity of the first wavelength band and light intensity of the second wavelength band as a two-dimensional image of radiated light from the water vapor.

(Aspect 6)

The temperature measuring device of any one of aspects 1-4, wherein the spectroscopic unit is provided with an optical system, and the optical system sends the radiated light of a point within the object to be measured to the spectroscopic unit.

(Aspect 7)

The temperature measuring device of aspect 6, wherein the spectroscopic unit is further provided with a light intensity acquisition unit that acquires light intensity in the first wavelength band and light intensity in the second wavelength band.

(Aspect 8)

The temperature measuring device of aspect 7, wherein the light intensity acquisition unit is provided with a first detection unit for acquiring light intensity in the first wavelength band, and a second detection unit for acquiring light intensity in the second wavelength band.

(Aspect 9)

The temperature measuring device of any one of aspects 1 to 8, wherein the temperature calculation unit calculates temperature of the water vapor using a calibration curve representing a relationship between a ratio of light intensity in the first wavelength band and light intensity in the second wavelength band, and water vapor temperature.

(Aspect 10) A gas temperature measuring device comprising a spectroscopic unit and a temperature calculation unit, wherein the spectroscopic unit acquires at least a light intensity in a first wavelength band and a light intensity in a second wavelength band, from radiated light from a gas that is an object to be measured. The gas has a strong emission spectrum accompanying heating in at least a near infrared region, compared to material normally present within the atmosphere. The first wavelength band and the second wavelength band are both near infrared region bands, a central wavelength of the first wavelength band and a central wavelength of the second wavelength band have mutually different values, and the temperature calculation unit calculates the temperature of the gas using a ratio of light intensity in the first wavelength band to light intensity in the second wavelength band.

(Aspect 11)

A temperature measuring method comprising a step of obtaining a ratio of light intensity of a first wavelength band to light intensity of a second wavelength band using irradiated light from water vapor that is contained in a gas that is an object to be measured, and a step of calculating temperature of the water vapor using this ratio, wherein the first wavelength band and the second wavelength band are both near infrared region bands, and a central wavelength of the first wavelength band and a central wavelength of the second wavelength band have mutually different values.

According to the present disclosure, it is possible to measure gas temperature in a non-contact manner and with good precision.

DETAILED DESCRIPTION

A temperature measuring device of a first embodiment of the present disclosure (hereafter sometimes abbreviated simply to "measuring device") will be described below with reference to the attached drawings.

Structure of the First Embodiment

Figure 1:
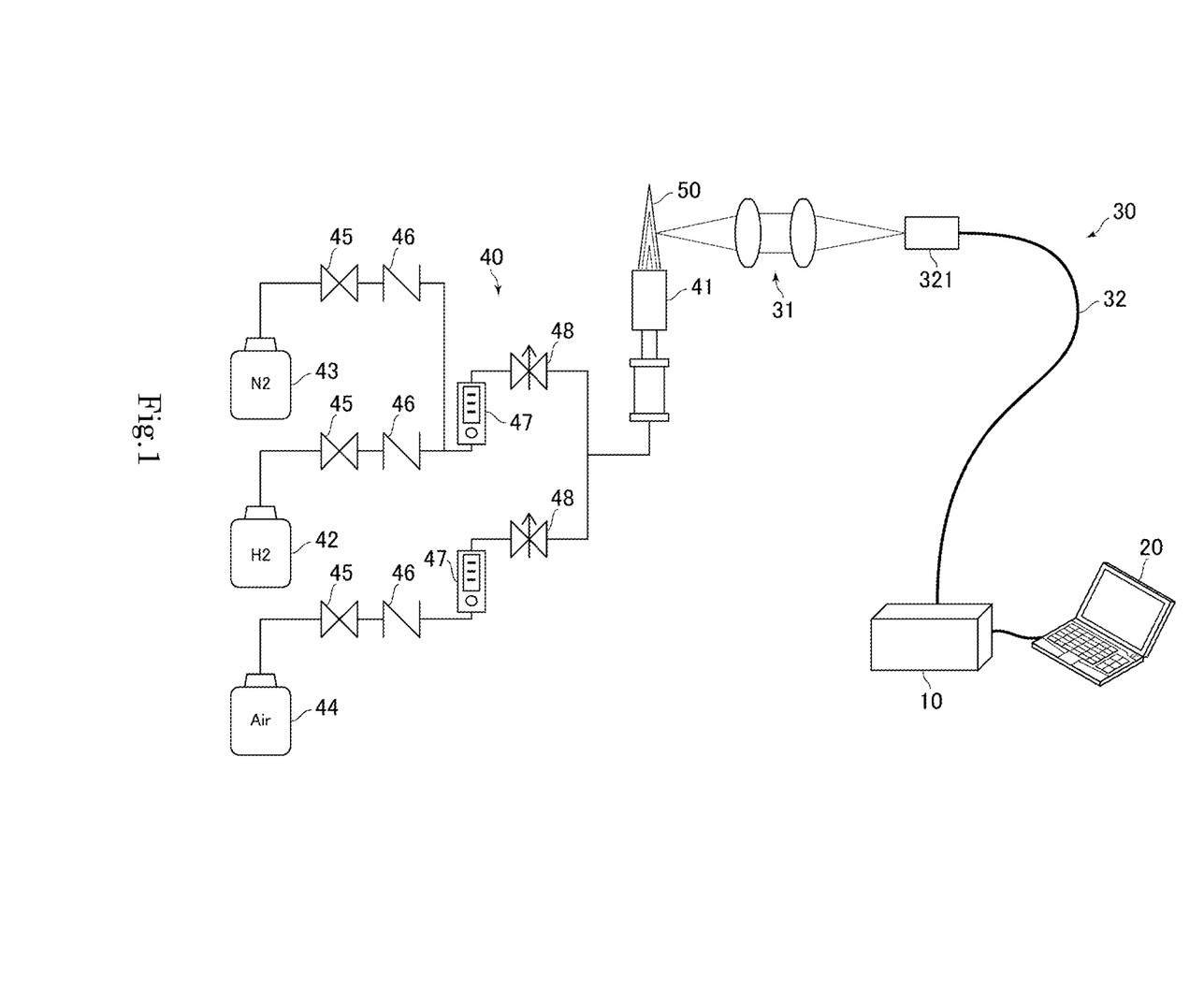
FIG. 1 is an explanatory drawing showing the schematic structure of a temperature measuring device of a first embodiment of the present disclosure.

A measuring device of this embodiment comprises a spectroscopic unit 10 and a temperature calculation unit 20 (refer to FIG. 1). This measuring device is further provided with an optical system 30 as an additional element. This measuring device is for measuring temperature of water vapor that is generated in a water vapor generating unit 40.

(Spectroscopic Unit)

The spectroscopic unit 10 acquires at least a light intensity in a first wavelength band and a light intensity in a second wavelength band, from radiated light from water vapor that is an object to be measured.

The spectroscopic unit 10 of this embodiment is constructed using a so-called spectrometer. The spectroscopic unit 10 of this embodiment acquires intensity of light that has been acquired for every required frequency band, and can transmit light intensity data for each frequency band to the temperature calculation unit 20.

Here, the first wavelength band and the second wavelength band used in this embodiment are both frequency bands in the near infrared region. A central wavelength of the first wavelength band and a central wavelength of the second wavelength band are made mutually different values.

Also, with this embodiment, the frequency band of the near infrared region is a frequency band of wavelengths about 700 nm to 2500 nm, and is more preferably a frequency band of wavelength about 700 nm to 1100 nm.

A central wavelength of the first wavelength band in this embodiment is within a range of about 810 to 890 nm, and a central wavelength of the second wavelength band is within the range of about 900 to 950 nm.

Also, with this embodiment, the first wavelength band and the second wavelength band are frequency bands that do not overlap with each other.

Detailed operation of the spectroscopic unit 10 will be described later.

(Optical System)

The optical system 30 transmits radiated light of a single point within an object to be measured to the spectroscopic unit 10. More specifically, the optical system 30 of this embodiment comprises a pair of lenses 31 and an optical fiber 32.

The lenses 31 send light from a single point of a flame 50 that is generated by a water vapor generating unit 40 to a light receiving unit 321 of the optical fiber 32. Also, depth of field of the lenses 31 is set to a comparatively narrow value, and as a result of this it becomes possible to measure temperature at a given position in a depth direction of the flame 50.

The optical fiber 32 transmits light flux that has been sent from the lenses 31 to the spectroscopic unit 10. Here, as the optical fiber 32 of this embodiment, one having excellent transmission characteristics in the first wavelength band and the second wavelength band is preferably used.

(Temperature Calculation Unit)

The temperature calculation unit 20 calculates temperature of water vapor using a ratio of light intensity in the first wavelength band to light intensity in the second wavelength band. The temperature calculation unit 20 can acquire data for these light intensities from the spectroscopic unit 10. The temperature calculation unit 20 of this example can be constructed by a combination of a personal computer and necessary computer programs, for example.

Figure 2:
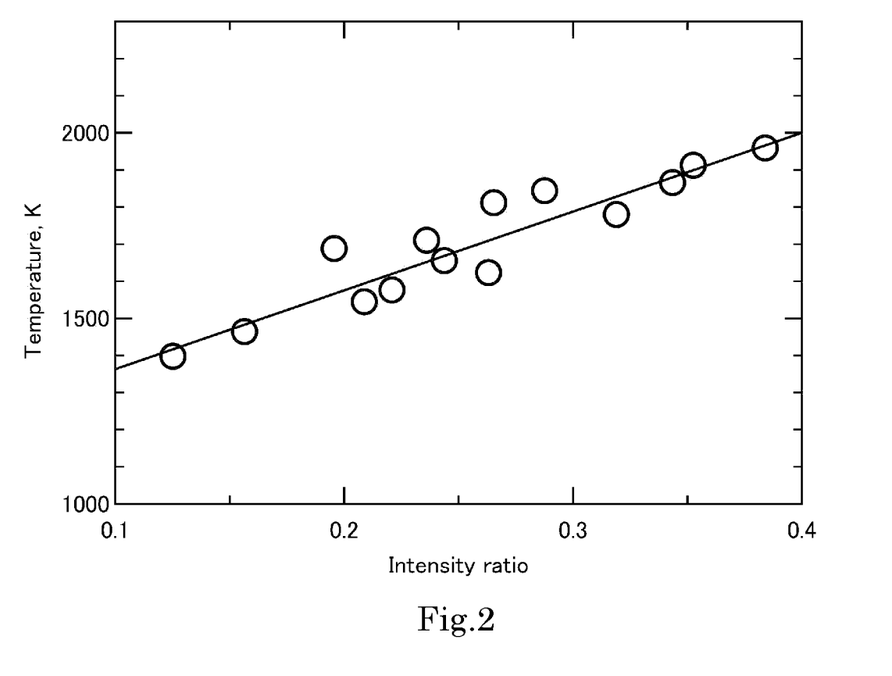
FIG. 2 is a graph showing one example of a calibration curve used to implement the device of FIG. 1, with the vertical axis showing temperature (K) and the horizontal axis showing light intensity ratio.

More specifically, the temperature calculation unit 20 calculates temperature of water vapor using a calibration curve that represents a relationship between a ratio of light intensity in the first wavelength band to light intensity in the second wavelength band, and water vapor temperature. FIG. 2 shows one example of a calibration curve representing a relationship between light intensity and temperature. The calibration curve of the illustrated example can be represented by the following linear function, for example.

$$y=f(x)=Ax+B$$

Here, y is temperature (K), x is light intensity ratio, and A, B are coefficients.

With the illustrated example, A=2154, and B=1143.

It should be noted that representing the calibration curve by a linear equation is merely one example, and does not mean the present disclosure is limited to this. Detailed operation of the temperature calculation unit 20 will be described later.

(Water Vapor Generating Unit)

The water vapor generating unit 40 is provided with a burner 41. The burner 41 generates a flame 50 by burning a mixed gas of $H_2$ gas 42, $N_2$ gas 43, and air 44 that has been fed to this burner 41. Since hydrogen is contained in the source gas used in this example, the flame 50 generally contains heated water vapor. It should be noted that the $N_2$ gas is used here in order to control combustion temperature. Also, the water vapor generating unit 40 is provided with valves 45 for opening and closing gas passages, check valves 46 for preventing reverse flow of gas, flow meters 47 for measuring flow amounts, and adjustment valves 48 for adjusting gas flow amounts.

(Water Vapor Temperature Measurement Method)

A procedure for obtaining temperature of water vapor (specifically, temperature of a gas) using the measuring device of the first embodiment that has been described above will be described with further reference to FIG. 3.

(Step SA-1 in FIG. 1)

First, the water vapor generating unit 40 is operated to generate the flame 50.

On the other hand, a focal point of the lenses 31 of the optical system 30 is adjusted to a single point of the flame 50 (for example, a point on the surface of the flame 50). In this way, emitted light from a single place in the flame 50 can be sent by the lenses 31 to the optical fiber 32. Here, the flame 50 of this example contains water vapor, and so emitted light from the flame 50 contains emitted light (radiated light) from the water vapor.

The optical fiber 32 transmits emitted light from the flame 50 to the spectroscopic unit 10. At the spectroscopic unit 10, light intensity of the first wavelength band and light intensity of the second wavelength band are acquired by spectroscopy. This process can be implemented similarly to a normal spectrometer, and so detailed description will be omitted. Data of the respective light intensity data that has been acquired is transmitted to the temperature calculation unit 20.

Here, as has already been described, the first wavelength band and the second wavelength band are both near infrared region frequency bands, and a central wavelength of the first wavelength band and a central wavelength of the second wavelength band are made mutually different values.

(Step SA-2 in FIG. 3) Next, the temperature calculation unit 20 acquires a ratio of light intensity in the first wavelength band to light intensity in the second wavelength band. It should be noted that here, in a case where there is a difference between transmittance of light of the first wavelength band and transmittance of light of the second wavelength band, it is possible to introduce a correction coefficient to compensate for this difference. If the ratio is made R, light intensity (brightness value) of the first wavelength band is made $I_1$, and light intensity of the second wavelength band is made $I_2$, it is possible to obtain the ratio from the following equation, for example.

$$R=K \cdot I_1/I_2$$

Here, K is a correction coefficient.

Figure 3:
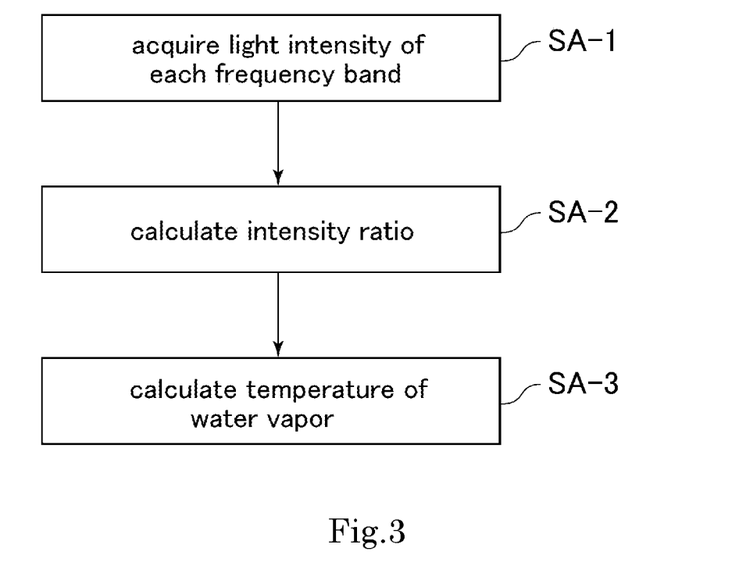
FIG. 3 is a flowchart for describing a procedure of a temperature measuring method that uses the device of FIG. 1.

(Step SA-3 in FIG. 3)

Next, the temperature calculation unit 20 calculates temperature of water vapor using the previously-described ratio. Here, the temperature calculation unit 20 uses the calibration curve shown in FIG. 2, as was described previously.

In this way, with this embodiment, it is possible to measure temperature of water vapor in a non-contact manner. In the case where a thermocouple, which is a contact type sensor, is used, there was a problem in that a system is disturbed by contact of the thermocouple. By contrast, with this embodiment, since detection is non-contact detection, there is no system disturbance and this gives rise to the advantage that it is possible to improve measurement accuracy.

Also, in a case where high temperature water vapor is measured with a thermocouple, in addition to the thermocouple disturbing the system because it is a contact type sensor, there is a problem in that temperature of the thermocouple is measured and not the temperature of the gas itself. Moreover, conditions such as heat resisting temperature of the thermocouple itself constitute constraints, and there is an upper limit to a measured temperature. Conversely, with this embodiment, since temperature is measured based on radiated light that has been acquired in a non-contact manner, in principle it is possible to measure temperature of a gas itself, that is in thermal equilibrium with water vapor, and there is also the advantage that there is no constraint on temperature upper limit.

Further, in a case of carrying out temperature measurement using ultraviolet light and infrared light, it becomes necessary to have separate devices in order to allow transmission and detection of ultraviolet light and infrared light, and device cost and running cost become significant. Conversely, with this embodiment, temperature measurement using near infrared light is possible. As a result, as an optical system in which a spectrometer and light detector are used, it is possible to use devices that utilize visible light or that have performance close to that for visible light, and it is possible to keep device cost and running costs low. That is, according to this embodiment, it is possible to carry out precise temperature measurement using a low-cost system.

Also, with a frequency band for near infrared light, radiation due to material other than water vapor is slight. This means that, by using the near infrared light, it is possible to improve a signal-to-noise (S/N) ratio of detected light intensity, and this point also makes it possible to improve measurement precision of water vapor temperature.

Further, in the case of high temperature measurement using a two color method that utilizes black-body radiation, solid matter such as particles is necessary. By contrast, with this embodiment, solid matter is not necessary, which results in an advantage that there are few constraints on usage environment.

Also, in a near infrared region where wavelength is 1100 nm or less, there is the advantage that it is possible to acquire light intensity using a generic visible light sensor.

Second Embodiment

Next, a temperature measuring device of a second embodiment of the present disclosure will be described with reference to FIG. 4. It should be noted that in the description of the second embodiment, complex description will be avoided by using the same reference numerals for elements that are basically common to the previously-described first embodiment.

With the second embodiment, a spectroscopic unit 210 is used instead of the spectroscopic unit 10 of the first embodiment. This spectroscopic unit 210 comprises a filter unit 211 and a light intensity acquisition unit 212.

The filter unit 211 comprises a first filter 2111 and a second filter 2112. The first filter 2111 can extract, from radiated light from the flame 50, light of the first wavelength band, and more specifically is configured using a band pass filter. Similarly the second filter 2112 can extract, from radiated light from the flame 50, light of the second wavelength band, and more specifically is configured using a band pass filter.

Respective lenses 31 are arranged between the flame 50, and the first filter 2111 and the second filter 2112. However, this arrangement is merely one example, and various arrangements may be adopted as long as it is possible to acquire light intensity in the required frequency bands.

A light intensity acquisition unit 212 of the second embodiment comprises a first detection section 2121 and a second detection section 2122. The first detection section 2121 detects intensity of light in the first wavelength band that has passed through the first filter 2111. Similarly, the second detection section 2122 detects intensity of light in the second wavelength band that has passed through the second filter 2112. It is possible to use, for example, photodiodes as these detection sections. However, it is possible to use another structure as long as it is possible to detect the necessary light intensities. Light intensity information that has been acquired by the light intensity acquisition unit 212 is transmitted to the temperature calculation unit 20 for every frequency band, similarly to the case of the first embodiment.

Figure 4:
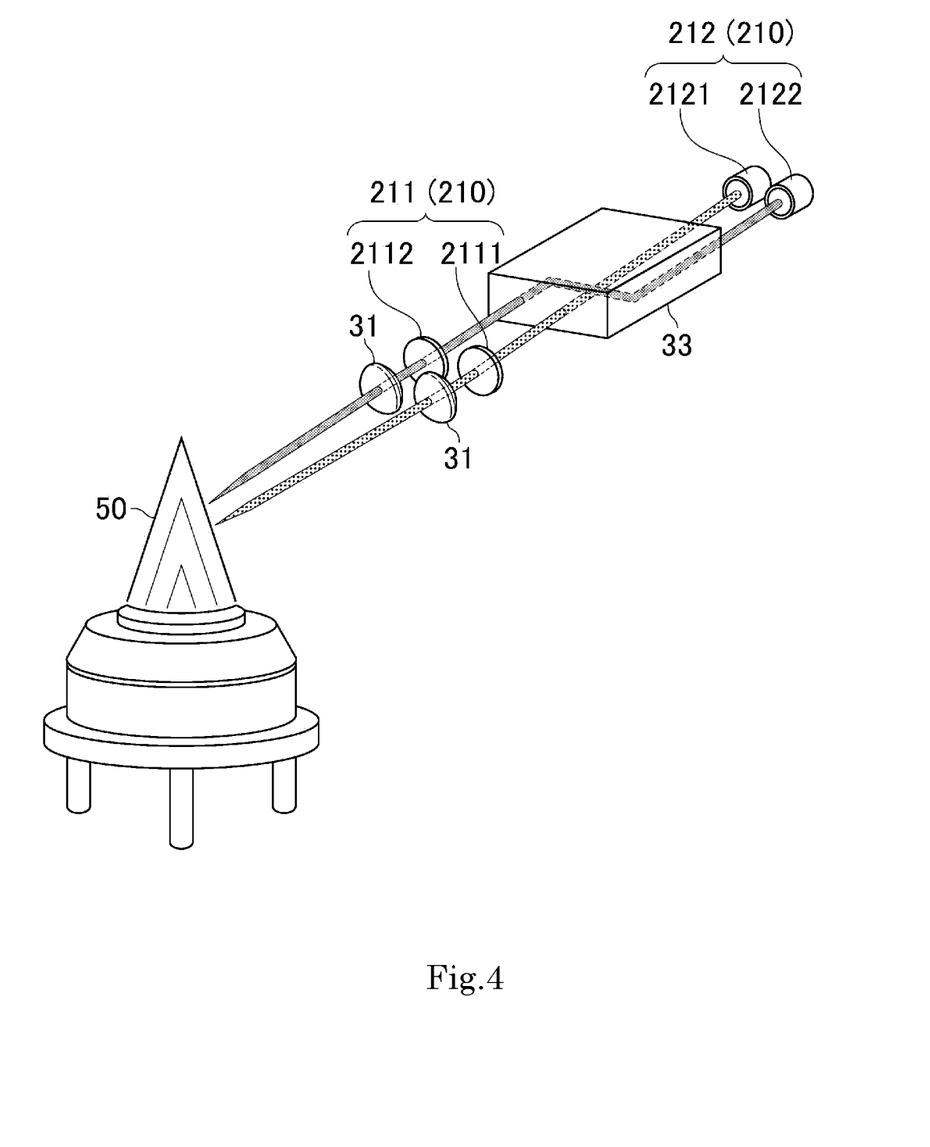
FIG. 4 is an explanatory drawing showing the schematic structure of a temperature measuring device of a second embodiment of the present disclosure.

Also, with the example of FIG. 4, light is transmitted by means of an image doubler 33 to the light intensity acquisition unit 212 instead of to the optical fiber 32.

The remaining structure and advantages of the second embodiment are basically the same as those of the first embodiment, and so more detailed description is omitted.

Third Embodiment

Next, a temperature measuring device of a third embodiment of the present disclosure will be described with reference to FIG. 5. It should be noted that in the description of the third embodiment, complex description will be avoided by using the same reference numerals for elements that are basically common to the previously-described first embodiment.

With the third embodiment, a spectroscopic unit 310 is used instead of the spectroscopic unit 10 of the first embodiment. This spectroscopic unit 310 comprises a filter unit 311 and a light intensity acquisition unit 312.

The filter unit 311 is provided with a first filter 3111 and a second filter 3112. The first filter 3111 can extract, from radiated light from the flame 50, light of the first wavelength band, and more specifically is configured using a band pass filter. Similarly the second filter 3112 can extract, from radiated light from the flame 50, light of the second wavelength band, and more specifically is configured using a band pass filter.

However, with the third embodiment, lenses are not arranged between the flame 50, and the first filter 3111 and the second filter 3112.

The light intensity acquisition unit 312 of the third embodiment acquires light intensity in the first wavelength band and light intensity in the second wavelength band as a two-dimensional image of radiated light from water vapor. The light intensity acquisition unit 312 transmits brightness information of each pixel as light intensity information to the temperature calculation unit 20. A camera that is capable of imaging with light in the near infrared region, for example, can be used as the light intensity acquisition unit 312.

Figure 5:
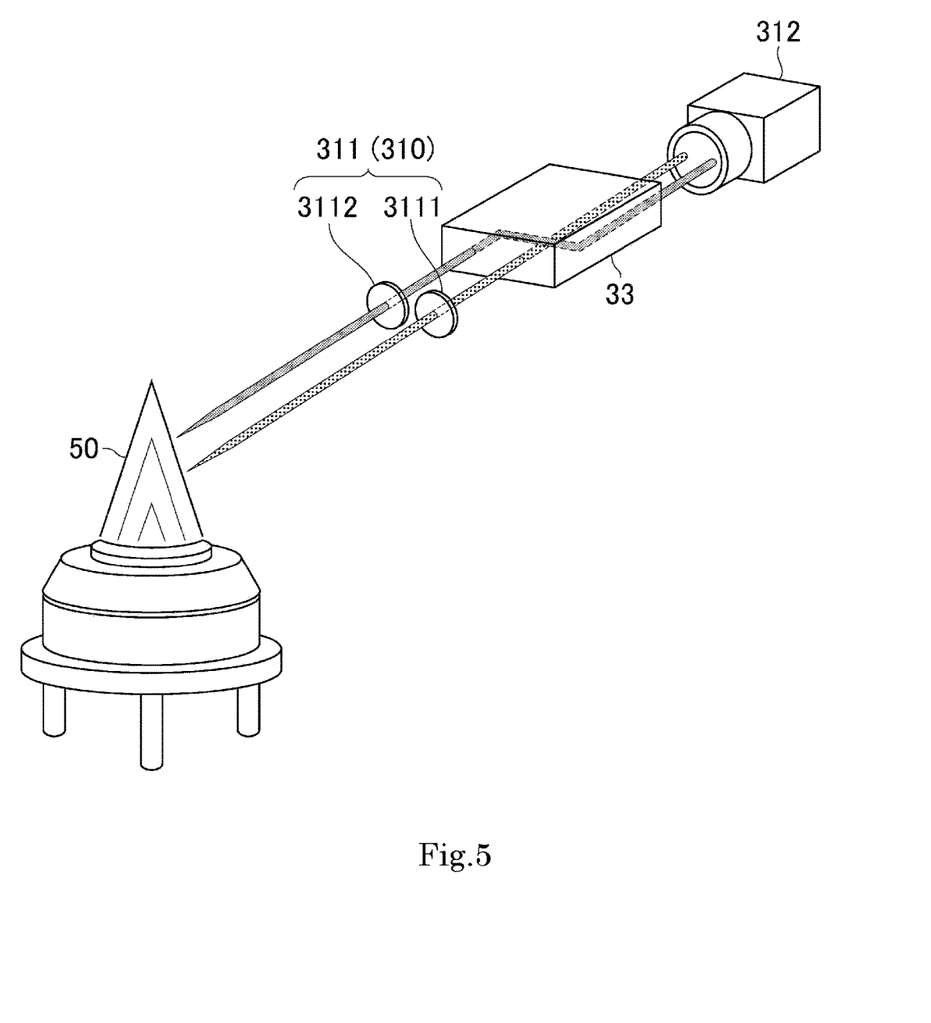
FIG. 5 is an explanatory drawing showing the schematic structure of a temperature measuring device of a third embodiment of the present disclosure.

With the example of FIG. 5, lights of two wavelength regions are made adjacent by means of the image doubler 33 instead of being supplied to the optical fiber 32 and transmitted to the light intensity acquisition unit 312 as a single image. However, as an optical system, it is only necessary to generate respective images in accordance with light of two wavelength bands, and beyond that is not specifically restricted.

With the third embodiment, brightness levels at the same position within real space in two two-dimensional images corresponding to the frequency bands (with this example, images consisting of different positions of a single image) can be used as the previously-described brightness values $I_1$ and $I_2$. As a result, with this embodiment, there is the advantage that it is possible to carry out temperature measurement at an arbitrary position within a plane. Alternatively, with this embodiment it is also possible to obtain temperature distribution within a two-dimensional plane.

The remaining structure and advantages of the third embodiment are basically the same as those of the first embodiment, and so more detailed description is omitted.

Practical Example 1

A calibration curve was created using filters having the following construction as a first filter and a second filter.
First filter
central wavelength: 850 nm,
half-value width: 50 nm
Second filter
central wavelength: 925 nm,
half-value width: 25 nm
A flame was generated using a pre-mixed fuel of $H_2$ and air. Flame conditions were as follows.
$H_2$ gas: 29 stdL/min
air: 46 stdL/min
equivalence ratio: 1.6
burning temperature: 1962 K (value 15 mm downstream of burner)

It should be noted that temperature measurement at the time of calibration curve creation used black-body radiation of an SiC filament that was arranged within the flame.

Temperature measurement was carried out using the structure of the third embodiment. Results substantially coincided with temperature distribution already demonstrated with other methods.

Practical Example 2

Compared to practical example 1, flame conditions were changed as follows.

H₂ gas: 5.0 stdL/min air: 34 stdL/min equivalence ratio: 0.4 burning temperature: 1797 K (value 15 mm downstream of burner)

Other conditions were the same as for practical example 1. With practical example 2 also, measurement results substantially coincided with temperature distribution already demonstrated with other methods.

Fourth Embodiment

Next, a temperature measuring device of a fourth embodiment of the present disclosure will be described with reference to FIG. 6 and FIG. 7. It should be noted that in the description of the fourth embodiment, complex description will be avoided by using the same reference numerals for elements that are basically common to the previously-described first embodiment and third embodiment.

Figure 6:
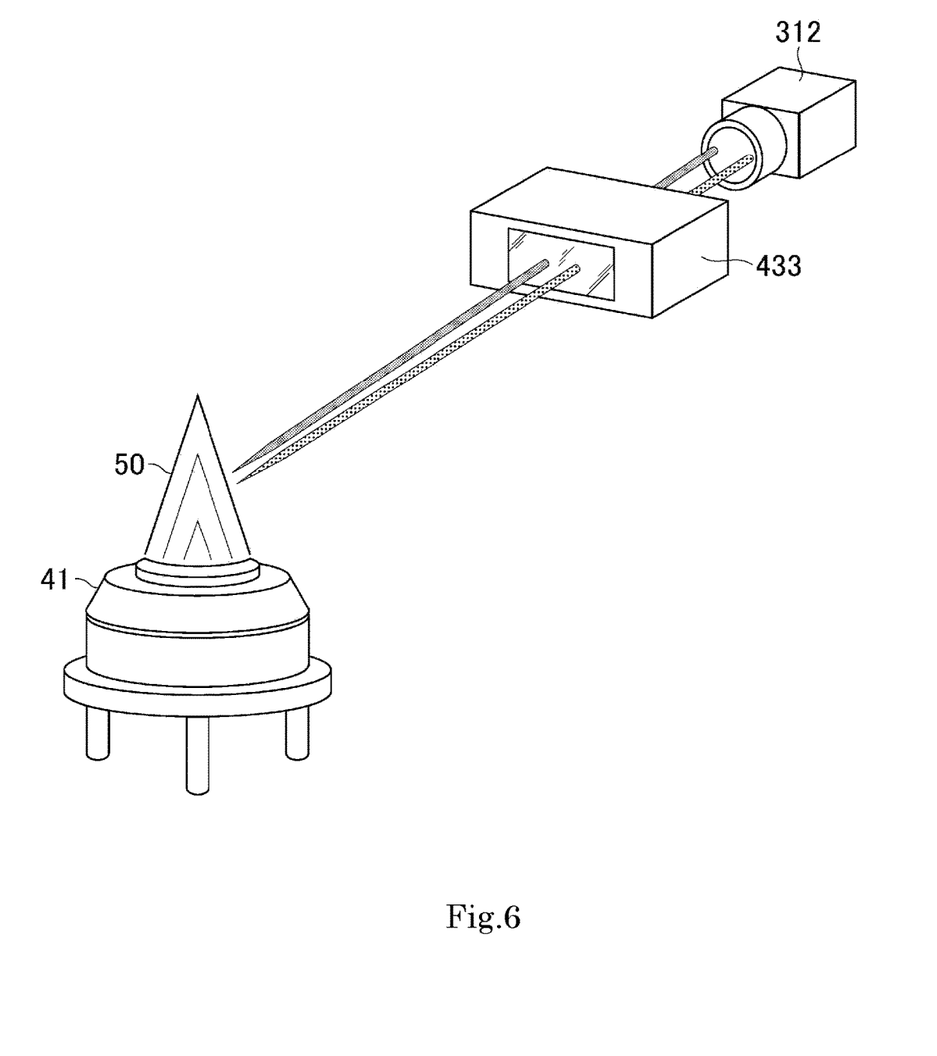
FIG. 6 is an explanatory drawing showing the schematic structure of a temperature measuring device of a fourth embodiment of the present disclosure.

With the fourth embodiment, an image doubler 433 is used instead of the image doubler 33 of the third embodiment (refer to FIG. 6). The image doubler 433 is provided with mirrors 4331 to 4338 for guiding the radiated light from the flame 50 (refer to FIG. 7). Among these mirrors, mirrors 4331 to 4334 form one light path 51 (for light of the first wavelength band), while mirrors 4335 to 4338 form another light path 52 (for light of the second wavelength band). Here, with this embodiment, the lengths of the light paths corresponding to the two frequency bands are effectively equal. Here, effectively means the light paths may be different to an extent that there is practically no problem, or with permissible error. Also, the structure of the mirrors is merely one example. In other words, the light paths may be configured appropriately for measurement.

Figure 7:
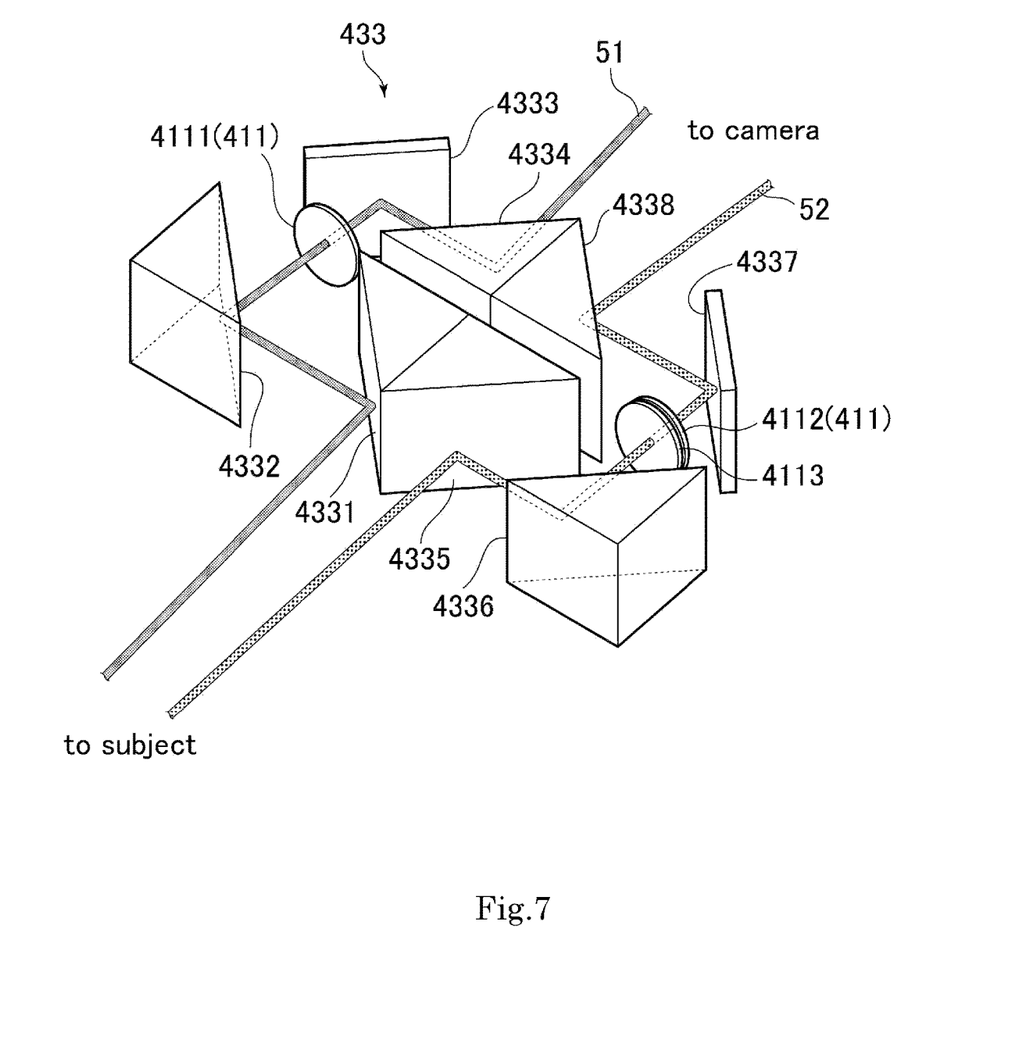
FIG. 7 is an explanatory drawing showing the schematic structure of principle parts of FIG. 6.

Also, with the fourth embodiment, a filter unit (corresponding to one example of a spectroscopic unit) 411 is used instead of the filter unit 311 of the third embodiment (refer to FIG. 7). The filter unit 411 is provided with a first filter 4111 and a second filter 4112. These filters are arranged within the image doubler 433. Also, the first filter 4111 is arranged on a light path for light of the first wavelength band, while the second filter 4112 is arranged on a light path for light of the second wavelength band. Positions of these filters do not need to be inside the image doubler 433, and may also be at positions in front of or behind the image doubler 433. In other words, each filter may be arranged on a corresponding light path. It should be noted that, with this example, a neutral-density (ND) filter 4113 for matching transmission properties of each filter is arranged adjacent to the second filter 4112, but it is possible to omit provision of this ND filter, or to change the position where the ND filter is set.

According to the device of the fourth embodiment, it is possible to make a light path distance from water vapor (emission source) to the light intensity acquisition unit 312 equal between light of the first wavelength band and the light of the second wavelength band. In the event that light path length differs for the two wavelength bands, the effects of disturbance and light attenuation amount may differ between the frequency bands, and there is a possibility of degradation in accuracy. By contrast, with the fourth embodiment, since the light path lengths are equal, there is the advantage that it is possible to expect improvement in temperature measurement precision.

The remaining structure and advantages of the fourth embodiment are basically the same as those of the third embodiment, and so more detailed description is omitted.

Fifth Embodiment

Figure 8:
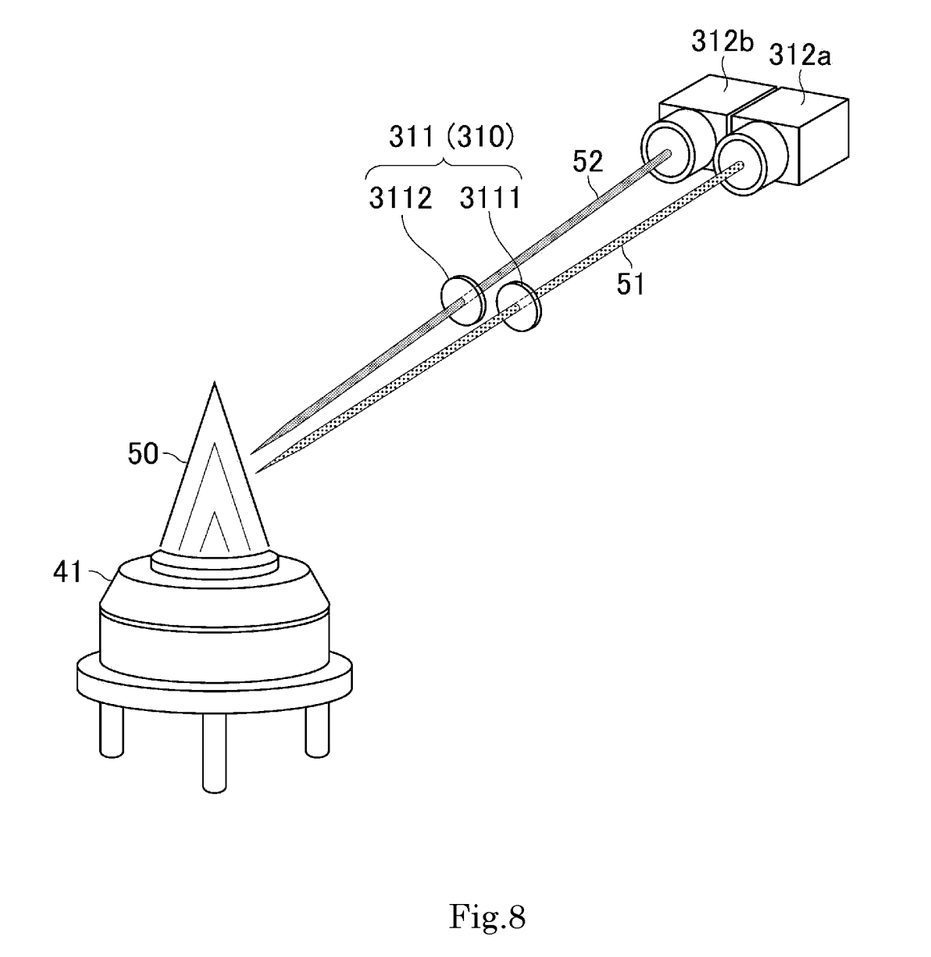
FIG. 8 is an explanatory drawing showing the schematic structure of a temperature measuring device of a fifth embodiment of the present disclosure.

Next, a temperature measuring device of a fifth embodiment of the present disclosure will be described with reference to FIG. 8. It should be noted that in the description of the fifth embodiment, complex description will be avoided by using the same reference numerals for elements that are basically common to the previously-described first embodiment and third embodiment.

With the fifth embodiment, the image doubler 33 of the third embodiment has been omitted. Further, two light intensity acquisition units 312a and 312b have been used instead of the single light intensity acquisition unit 312. With this example, a light path 51 that passes through the first filter 3111 is incident on the light intensity acquisition unit 312a, while a light path 52 that passes through the second filter 3112 is incident on the light intensity acquisition unit 312b. Specifically, with this embodiment, images are respectively created corresponding to each frequency band, and it is possible to carry out temperature measurement by acquiring the previously-described brightness values $I_1$ and $I_2$. Here, a correspondence relationship between coordinates on an image and coordinates in real space, for each image, is acquired using an appropriate method such as calibration, and by calculating temperature of an arbitrary position on an image, it is possible to measure temperature at an arbitrary position in real space that appears in that image.

With the device of the fifth embodiment also, there is the advantage that it is possible to make light path lengths from the water vapor to the light intensity acquisition units 312a and 312b equal between light of the first wavelength band and light of the second wavelength band.

The remaining structure and advantages of the fifth embodiment are basically the same as those of the third embodiment, and so more detailed description is omitted.

It should be noted that the content of the present disclosure is not limited to each of the described embodiments. Various modifications are possible to the specific structure of the present disclosure, within the scope described in the patent claims.

For example, wavelength bands of the infrared light used in temperature measurement are not limited to those described above, and it is possible to use other bands.

Also, the description above has assumed a combustion system but the present disclosure is not limited to combustion, and temperature measurement of water vapor existing in other reaction systems is also possible.

Further, as a spectroscopic unit, besides those described above, it is possible to use other appropriate spectroscopic means, such as a prism, for example.

Also, as a light intensity acquisition means of the spectroscopic unit, is possible to use various configurations, such as a method of acquiring light intensities in two bands using a single camera, a method of acquiring light intensity in each band using respective cameras, etc.

Also, the previously-described spectroscopic unit can be provided with a light intensity amplification unit, for example, an image intensifier, or a photomultiplier tube. By doing this, in a case where radiated light from water vapor is weak, a case where water vapor density is low, a case where water vapor is low temperature, or in a case of measurement at high speed, it is possible to amplify radiated light and acquire light intensity in required bands at a high S/N ratio.

Further, with each of the embodiments described above, the description has been provided for temperature measurement of water vapor, but it is also possible to use a gas that has a strong emission spectrum in the near infrared region instead of water vapor. In normal environments, as a material that has a strong emission spectrum in the near infrared region, there is only water vapor, and so by using such a gas that has a strong emission spectrum in the near infrared region, it becomes possible to perform temperature measurement in an environment where water vapor is thin.

Also, each of the above-described structural elements, for example, the temperature calculation unit, can exist as a functional block, and can also exist as independent hardware. Also, as a method of implementation, it is possible to use hardware or to use computer software. Further, a single functional element of the present disclosure may be realized as a set of a plurality of functional elements, and a plurality of functional elements of the present disclosure may be implemented by a single functional element.

Further, functional elements may be located at positions that are physically separated from one another. In this case, associated functional elements may be connected by means of a network. Functions may be realized by means of grid computing or cloud computing, and alternatively functional elements may also be constituted.

DESCRIPTION OF THE REFERENCE NUMERALS 10, 210, 310 spectroscopic unit
211, 311, 411 filter unit
2111, 3111, 4111, first filter
2112, 3112, 4112, second filter
212, 312 light intensity acquisition unit
2121 First detection unit
2122 second detection unit
20 temperature calculation unit
30 optical system
31 Lens
32 optical fiber
321 light receiving section
33, 433 image doubler
4331 to 4338 Mirror
40 water vapor generating section
41 Burner
42 $H_2$ gas
43 $N_2$ gas
44 Air
45 Valve
46 check valve
47 flow meter
48 adjustment valve
50 Flame
51 light path of first wavelength band
52 light path of second wavelength band The various embodiments described above can be combined to provide further embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A temperature measuring device comprising a spectroscopic unit and a temperature calculation unit, wherein
the spectroscopic unit is configured to acquire at least a light intensity in a first wavelength band and a light intensity in a second wavelength band, from radiated light from water vapor that is contained in a gas that is an object to be measured,
the first wavelength band and the second wavelength band are both near infrared region bands,
a central wavelength of the first wavelength band and a central wavelength of the second wavelength band are set to be mutually different values, and
the temperature calculation unit calculates the temperature of the water vapor using a ratio of light intensity in the first wavelength band to light intensity in the second wavelength band.

2. The temperature measuring device of claim 1, wherein the near infrared region band is a wavelength band of about 700 nm to 2500 nm.

3. The temperature measuring device of claim 1, wherein the central wavelength of the first wavelength band is within a range of about 810 to 890 nm, and the central wavelength of the second wavelength band is in a range of about 900 to 950 nm.

4. The temperature measuring device of claim 1, wherein the first wavelength band and the second wavelength band are set to bands that do not overlap each other.

5. The temperature measuring device of claim 1, wherein the spectroscopic unit is provided with a light intensity acquisition unit that acquires light intensity of the first wavelength band and light intensity of the second wavelength band as a two-dimensional image of radiated light from the water vapor.

6. The temperature measuring device of claim 1, wherein the spectroscopic unit is provided with an optical system, and the optical system sends the radiated light of a point within the object to be measured to the spectroscopic unit.

7. The temperature measuring device of claim 6, wherein the spectroscopic unit is further provided with a light intensity acquisition unit that acquires light intensity in the first wavelength band and light intensity in the second wavelength band.

8. The temperature measurement device of claim 7, wherein the light intensity acquisition unit is provided with a first detection unit for acquiring light intensity in the first wavelength band, and a second detection unit for acquiring light intensity in the second wavelength band.

9. The temperature measuring device of claim 1, wherein the temperature calculation unit is configured to calculate temperature of the water vapor using a calibration curve representing a relationship between a ratio of light intensity in the first wavelength band to light intensity in the second wavelength band, and water vapor temperature.

10. A gas temperature measuring device comprising a spectroscopic unit and a temperature calculation unit, wherein
the spectroscopic unit is configured to acquire at least a light intensity in a first wavelength band and a light intensity in a second wavelength band, from radiated light from a gas that is an object to be measured,
the gas has a strong emission spectrum accompanying heating, compared to material normally present within the atmosphere, in at least a near infrared region,
the first wavelength band and the second wavelength band are both near infrared region bands, a central wavelength of the first wavelength band and a central wavelength of the second wavelength band are set to be mutually different values, and the temperature calculation unit calculates the temperature of the gas using a ratio of light intensity in the first wavelength band to light intensity in the second wavelength band.

11. A temperature measuring method comprising:

obtaining a ratio of light intensity of a first wavelength band to light intensity of a second wavelength band, using irradiated light from water vapor that is contained in a gas that is an object to be measured, and calculating temperature of the water vapor using the ratio, wherein the first wavelength band and the second wavelength band are both near infrared region bands, and wherein a central wavelength of the first wavelength band and a central wavelength of the second wavelength band have mutually different values.

* * * * *